(12) United States Patent
Tagliaferri

(10) Patent No.: US 12,173,461 B2
(45) Date of Patent: Dec. 24, 2024

(54) AUTOMATED ROAD SWEEPER AND ROAD CLEANING METHOD USING SAID ROAD SWEEPER

(71) Applicant: DULEVO INTERNATIONAL S.P.A., Fontanellato (IT)

(72) Inventor: Fabrizio Tagliaferri, Trecasali (IT)

(73) Assignee: DULEVO INTERNATIONAL S.P.A., Fontanellato (IT)

( * ) Notice: Subject to any disclaimer, the term of this patent is extended or adjusted under 35 U.S.C. 154(b) by 498 days.

(21) Appl. No.: 17/424,644

(22) PCT Filed: Dec. 12, 2019

(86) PCT No.: PCT/IB2019/060720
§ 371 (c)(1),
(2) Date: Jul. 21, 2021

(87) PCT Pub. No.: WO2020/152526
PCT Pub. Date: Jul. 30, 2020

(65) Prior Publication Data
US 2022/0120047 A1 Apr. 21, 2022

(30) Foreign Application Priority Data

Jan. 25, 2019 (IT) .......................... 102019000001111

(51) Int. Cl.
*E01H 1/04* (2006.01)
*A46B 13/00* (2006.01)
(Continued)

(52) U.S. Cl.
CPC .............. *E01H 1/04* (2013.01); *A46B 13/008* (2013.01); *A46B 13/02* (2013.01);
(Continued)

(58) Field of Classification Search
CPC .............. A46B 13/008; A46B 15/0004; A46B 2200/3066; E01H 1/101; E01H 1/0845;
(Continued)

(56) References Cited

U.S. PATENT DOCUMENTS

2018/0361577 A1  12/2018  Williams et al.

FOREIGN PATENT DOCUMENTS

| CN | 111608118 A | * | 9/2020 | ............. E01H 1/005 |
| DE | 102014102540 A1 | | 8/2015 | |
| WO | 2016198044 A2 | | 12/2016 | |

OTHER PUBLICATIONS

The International Search Report and Written Opinion, mailed Apr. 14, 2020.
The Italian Search Report, completed Jul. 19, 2019.

* cited by examiner

*Primary Examiner* — Randall E Chin
(74) *Attorney, Agent, or Firm* — Vorys, Sater, Seymour and Pease LLP

(57) ABSTRACT

An automated road sweeper is provided including transport apparatus suitable to allow the sweeper to travel on a road surface including debris, a plurality of cleaning members arranged at fixed points located in different portions of the sweeper and suitable for cleaning within predetermined cleaning areas, and a selector operatively connected to the cleaning members, suitable for scanning the road surface and locating the debris so as to select and exclusively operate the cleaning members, the cleaning area of which covers the debris during the movement of the sweeper.

13 Claims, 2 Drawing Sheets

(51) Int. Cl.
  *A46B 13/02*  (2006.01)
  *A46B 15/00*  (2006.01)
  *E01H 1/05*  (2006.01)
  *E01H 1/08*  (2006.01)
  *G06V 10/75*  (2022.01)
  *G06V 20/56*  (2022.01)
  *E01H 1/10*  (2006.01)

(52) U.S. Cl.
  CPC .......... *A46B 15/0004* (2013.01); *E01H 1/053* (2013.01); *G06V 10/751* (2022.01); *G06V 20/588* (2022.01); *A46B 2200/3066* (2013.01); *E01H 1/0854* (2013.01); *E01H 1/101* (2013.01)

(58) Field of Classification Search
  CPC ........... E01H 1/0854; E01H 1/04; E01H 1/05; E01H 1/053
  See application file for complete search history.

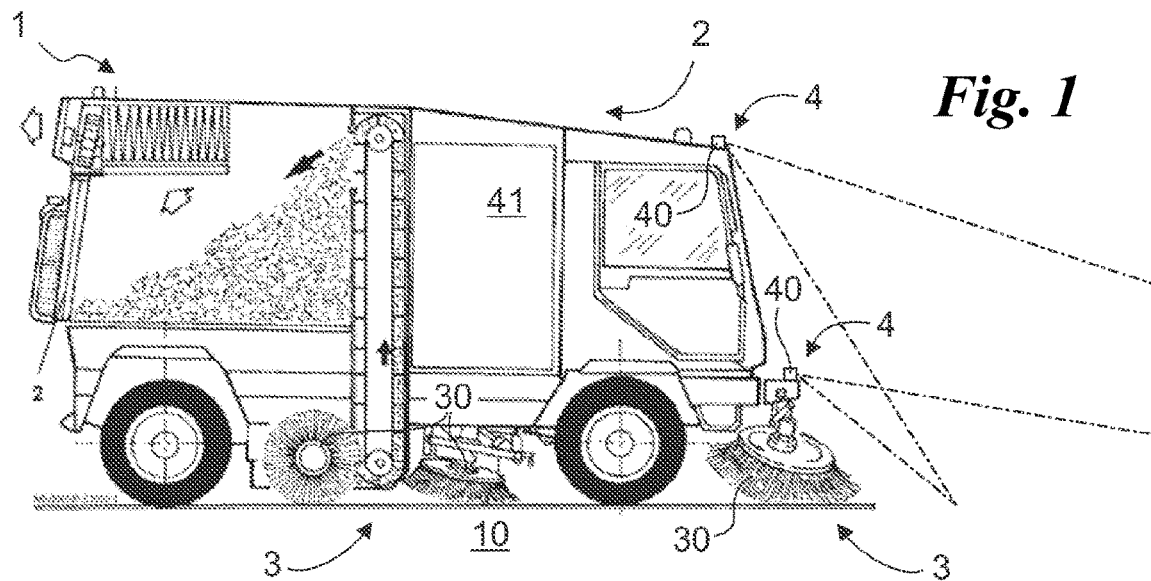
*Fig. 1*
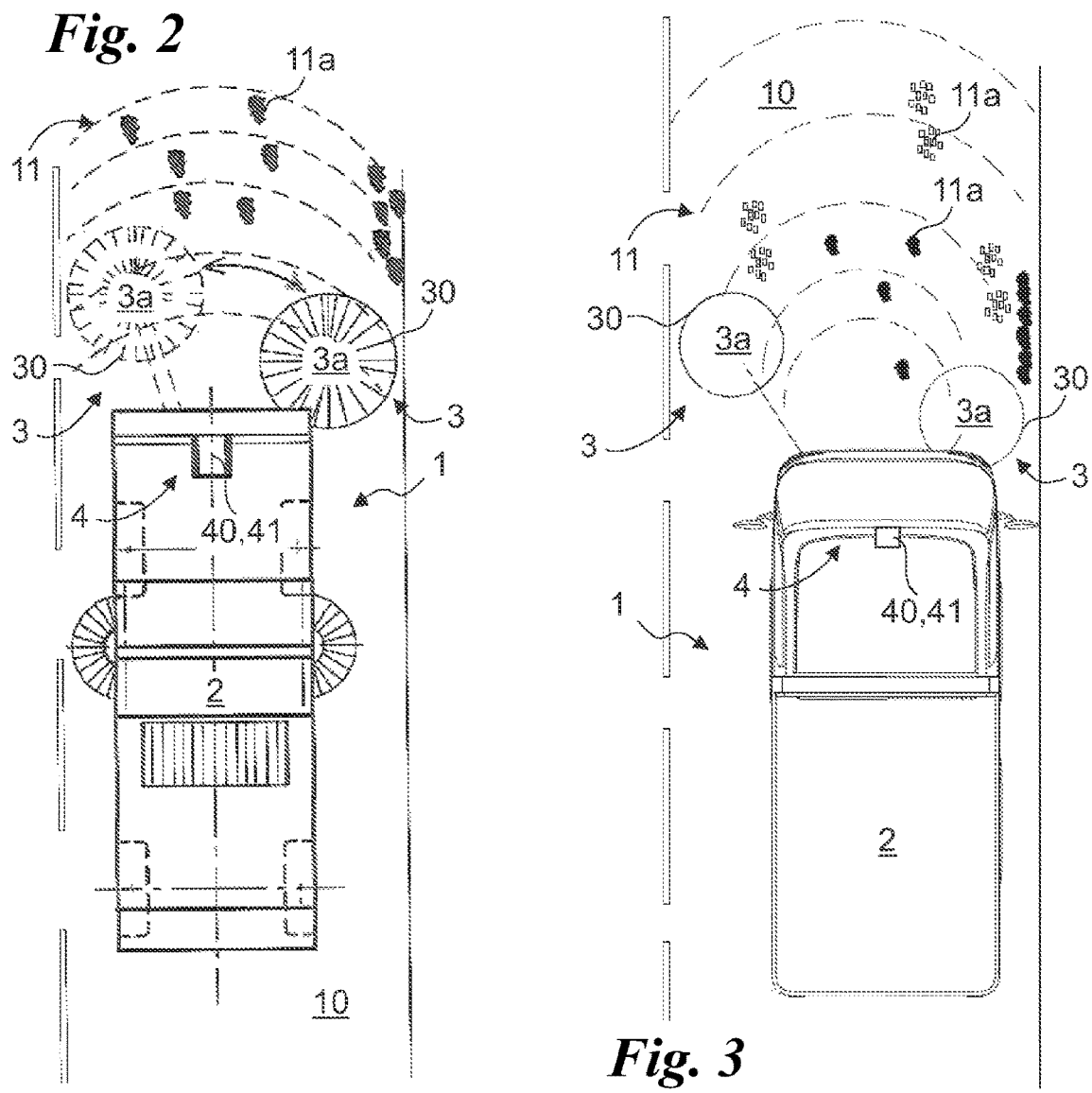
*Fig. 2*
*Fig. 3*

AUTOMATED ROAD SWEEPER AND ROAD CLEANING METHOD USING SAID ROAD SWEEPER

FIELD OF THE INVENTION

The present invention relates to an automated road sweeper and road cleaning method of said road sweeper.

In particular, the present invention relates to a motorized sweeper that can be driven by at least one operator and is suitable for cleaning the road base of dirt or debris, such as gravel, which may obstruct or, in any case, interfere with the circulation path of vehicles on at least one section of road.

BACKGROUND OF THE INVENTION

A similar sweeper is described in the patent application WO-A-2016/198044.

As is well known, a sweeper machine generally comprises a motorized vehicle, i.e. equipped with a motor suitable for making the vehicle itself autonomously mobile, a plurality of brushes emerging from the vehicle and intended for direct contact with the ground, a waste container, and a conveyor capable of sending the waste collected by the brushes into the waste container.

In addition, an auxiliary tank can be set up next to the waste container and the conveyor for containing water to be distributed on the ground in order to dampen it before removing waste.

Some sweeper machines can also proceed to cleaning the road surface or the common area by sprinkling them with abundant water.

In these cases, specially equipped vehicles are used with a front bar, on which washing nozzles are fitted; a large water tank; and a pumping unit that sends water to the above-mentioned nozzles.

The prior art described comprises several significant drawbacks.

In particular, road surfaces do not all have the same conformation, but they can have surfaces that include a plurality of materials or, even, a plurality of portions separated from each other.

In addition to roads made of common material, such as asphalt or tar, at present, there are stony or cobblestone roads, especially within the historical centre of Italian towns, which are, therefore, very irregular.

Therefore, the cleaning means used are not suitable for all types of roads and may have effects that are contrary to the functions for which they are intended. For example, incorrect cleaning or using incorrect tools can lead to the deposit of waste material inside the cracks that separate the cobblestones.

In addition, roads may not be completely covered with waste, but they may have empty areas where brushing is not necessary; however, the current state of the art sweepers are not able to operate the cleaning means effectively and when required.

A further drawback, therefore, is the fact that the sweepers needlessly consume a large amount of energy to continuously feed the cleaning means.

The only expedients that can be implemented involve direct action by the operator who, from the cab, sees the material in front of him, while the machine is moving forward, and can act on the hydraulic commands. This material in general is, as already mentioned, very variable and may comprise, in even more detail, undifferentiated debris, general, mixed dirt, material from construction sites, stones, plastic, cardboard, market waste, leaves, sand, bottles, pebbles of various sizes, gravel, or a mix of all of these. This material, as well as being mixed, has a non-homogeneous distribution on the road or on the square. In this situation the operator, in order to optimise the work of the machine, must manually vary the different functions and mechanisms of the sweeper to adapt them to the type and ground distribution of the material in front of him.

Currently, the operator obtains the variation by operating a series of commands, knobs, and joysticks in the cab and must, simultaneously, drive the vehicle, identify the material on the ground, look at the road, check the other vehicles, avoid pedestrians and any obstacles, even sudden ones, and periodically check the rear video camera to see if the sweeper is collecting waste well.

In view of this considerable variability in manoeuvres and the attention that the operator must pay, s/he must have considerable experience in manually adapting the operation of the machine to the type of material to be removed. In these working conditions, the operator is then subjected to possible stresses or carelessness that may lead to accidents or the incorrect use of the road sweeper. These difficulties generally mean that the operator does not adapt the operation of the sweeper machine to the material on the ground, but maintains all the operating parameters of the brushes, the central roller, and the suction at maximum power and speed, even when not needed. This leads to the motor's consuming a lot of energy, the hydraulic oil's greatly heating up, and the brushes', and, generally, the machine's, being subjected to excessive wear.

SUMMARY OF THE INVENTION

In this context, the technical task underlying the present invention is to devise an automated road sweeper and road cleaning method of said road sweeper, which is capable of substantially obviating at least some of the above-mentioned drawbacks.

In the context of said technical task, one important purpose of the invention is to obtain a road sweeper that is able to recognise the type of road surface on which it is carrying out the cleaning steps.

Another important purpose of the invention is to create a road sweeper that is able to operate the cleaning means in a selective manner according to the type and density of debris on the road.

Therefore, an additional purpose of the invention is to create a sweeper that has lower energy consumption than the sweepers present in the current state of the art.

The technical purpose and specified aims are achieved by an automated road sweeper as claimed.

Preferred technical embodiments are described in the claims.

BRIEF DESCRIPTION OF THE DRAWINGS

The features and advantages of the invention are clearly evident from the following detailed description of preferred embodiments thereof, with reference to the accompanying drawings, in which:

FIG. 1 shows a lateral view of an automated road sweeper according to the invention;

FIG. 2 shows a top view of an automated road sweeper according to the invention during the cleaning operations; and FIG. 3 is an example of an alternative arrangement of the selection means of an automated road sweeper according to the invention.

DETAILED DESCRIPTION OF PREFERRED EMBODIMENTS OF THE INVENTION

Figure 4:
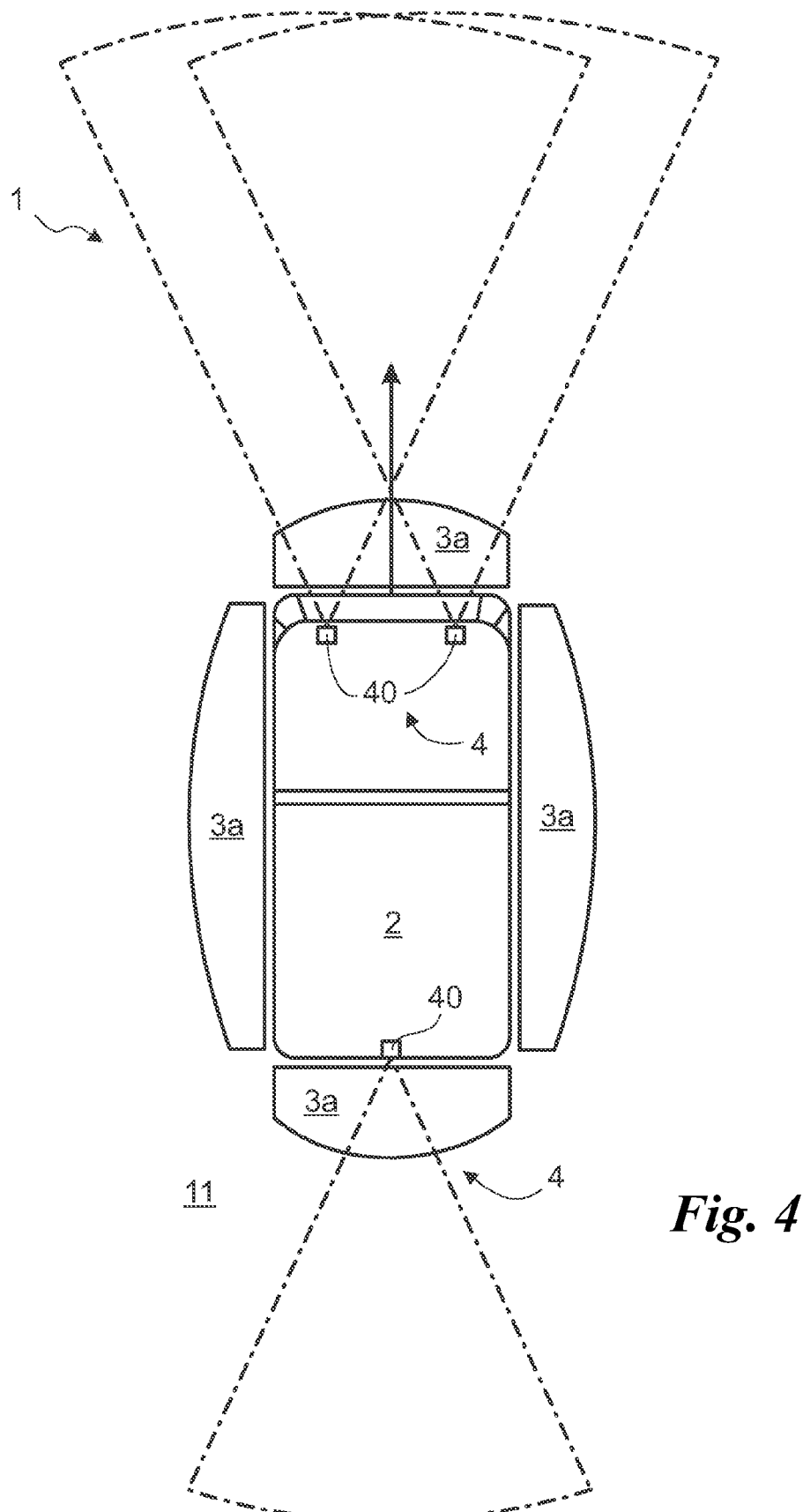
FIG. 4 is an example of an alternative arrangement of the selection means of an automated road sweeper according to the invention.

In this document, the measures, values, shapes, and geometric references (such as perpendicularity and parallelism), when associated with words like "about" or other similar terms such as "approximately" or "substantially", are to be understood as except for measurement errors or inaccuracies owing to production and/or manufacturing errors and, above all, except for a slight divergence from the value, measure, shape, or geometric reference with which it is associated. For example, said terms, if associated with a value, preferably indicate a divergence of not more than 10% of said value.

In addition, where used, terms such as "first", "second", "upper", "lower", "main" and "secondary" do not necessarily refer to an order, a priority relationship or relative position, but may simply be used to more clearly distinguish different components from each other.

The measurements and data presented herein are to be considered, unless otherwise indicated, as made in Standard International Atmospheres ICAO (ISO 2533: 1975).

With reference to the Figures, the number 1 globally denotes the automated road sweeper according to the invention.

The sweeper 1 is preferably a motorized means suitable for allowing the cleaning of a road surface 10.

The road surface 10 is preferably defined by the flooring of any common or public area and can, for example, comprise a plurality of different materials that may also be configured in different ways.

For example, the road surface 10 may comprise asphalt or tar or similar paving materials, including those used for indoor structures, or it may also comprise pebbles, of which the classic cobblestone is a typical example, and have an irregular shape in which escape routes are also provided.

Even the term road surface 10 can be broadly understood as the flooring of a building, and the sweeper 1 itself can be a small machine suitable for cleaning the floors of closed rooms.

The road surface 10 can therefore comprise a plurality of types of debris 11.

The debris 11 comprises, for example, dirt that is commonly deposited on road surfaces 10, or may be waste deposited on the surface 10, or may be damaged portions of the road surface 10.

Therefore, different types of debris can be identified among the debris 11. Each of the different types of debris 11 is, therefore, a specific debris 11a.

The specific term debris 11a means one or more types of debris 11 that can be removed or cleaned with the help of the same cleaning device. Thus, for example, each of the grains of sand or gravel is included within a specific type of debris 11a, just as broken glass, metal, or solid polymer parts, are also part of the same specific type of debris 11a.

The sweeper 1 is preferably largely known in the current state of the art and is a machine suitable for allowing the removal or cleaning of debris 11 from the road surface 10.

The sweeper 1 comprises means of transport 2 and at least one cleaning member 3.

The means of transport 2 are preferably suitable for allowing the sweeper 1 to travel on the road surface 10. Normally, the sweeper 1 travels by the means of transport 2 on a road surface 10 comprising debris 11. In turn, the debris 11 may comprise one or more specific types of debris 11a.

The means of transport 2 therefore comprise the transport devices such as the wheels or tracks and the motor and driver's compartment. In general, the term means of transport 2 means everything that allows an operator to move the sweeper 1 on the road surface 10.

The cleaning members 3 are, on the other hand, suitable for cleaning the road surface 10. In the current state of the art, many different cleaning members 3 are known, which have different conformations in order to allow the removal of specific different debris 11a, or even just the cleaning of the road surface 10.

Preferably, if there are more than one cleaning device 3, they are arranged at fixed points located on different portions of the sweeper 1.

For example, cleaning members 3 can be provided on the front or side portion, or even on the rear portion, of the sweeper 1 and as, for example, shown in FIG. 1 and FIG. 3.

The cleaning members 3 are preferably tools that define a machining capacity and, therefore, essentially define a cleaning area 3a.

The cleaning area 3a is preferably the area underneath the individual brush or, if the cleaning member 3 is of a different kind, the area underneath the cleaning tool. In addition, the cleaning area 3a should be considered, more broadly, as the area that the cleaning members 3 can describe when travelling.

Considering that the sweeper 1 comprises, as mentioned, means of transport 2 as well, and is suitable for working while travelling, the cleaning area 3a is essentially the space defined by the cleaning members 3 along the travelling trajectory of the sweeper 1.

The various cleaning members 3 may comprise brushes, or a bar comprising washing nozzles, or both. In addition, there may also be suction means suitable for removing debris 11 by creating a vacuum.

Each of the cleaning members 3 can in fact include one or more cleaning heads 30.

The cleaning heads 30 are preferably the ends of each cleaning member 3 that are suitable for interacting with the road surface 10 and, therefore, they can correspond respectively to the brushes or to the washing bar or to the suction means described above.

Therefore, each of the cleaning heads 30 is preferably suitable for cleaning a specific type of debris 11a, or it may be necessary to combine the different cleaning heads 30 for removing specific types of debris 11a.

In any case, all the above-mentioned features are essentially known in the current state of the art and are, at least in part, present on various sweepers for example those marketed by the same applicant.

In general, therefore, the sweeper 1 is essentially, preferably, a motorized vehicle, i.e. equipped with motors, including electric ones, suitable for making the vehicle itself autonomously mobile, a plurality of brushes, or other similar tools, emerging from the vehicle and intended for direct contact with the ground, a waste container and a conveyor capable of sending the waste collected by the brushes into the waste container.

The sweeper 1 advantageously comprises, in addition to what is commonly present, selection means 4.

The selection means 4 are preferably operatively connected to the cleaning members 3. Therefore, the sweeper may, preferably, comprise electronic, or even mechanical or mechatronic, connections between the cleaning members 3 and the selection means 4 so that the selection means 4 can alter the behaviour of the cleaning means 3.

This can be done, for example, by allowing the selection means 4 to command at least part of the cleaning means 3 replacing, for example, the manual commands usually given by an operator in the cab of the sweeper 1.

The selection means 4 can perform a plurality of functions.

Considering a sweeper 1 comprises a plurality of cleaning members 3 positioned at fixed points of different portions of the sweeper 1, the selection means 4 are preferably suitable for scanning the road surface 10.

Obviously, the selection means 4 should be suitable for scanning at least part of the road surface 10 and not necessarily the whole road surface 10.

In addition, the selection means 4 locate the debris 11 so as to select and operate only the cleaning members 3 the cleaning area 3a of which covers the debris 11 during the movement of the sweeper 1.

Therefore, the selection means 4 are essentially suitable for defining target elements that condition the operation of the cleaning members 3.

In addition to the features indicated, if each of the cleaning members 3 comprises a plurality of cleaning heads 30, or alternatively to what is indicated, if the sweeper 1 includes, for example, a single cleaning member 3 comprising a plurality of cleaning heads 30, the selection means 4 preferably identify the type of debris 11 and select the cleaning head 30 corresponding to the specific type of debris 11a.

In particular, the selection means 4 comprise optical means 40.

The optical means 40 are suitable for recording at least one frame of the road surface 10. The term frame means a specific image or an ideal structure that represents the scanned environment or a sequence of elements. Preferably, therefore, the optical means 40 comprise at least one video camera.

The optical means 40 can, therefore, comprise only one video camera.

More preferably, the optical means 40 comprise a plurality of video cameras suitable for reconstructing the three-dimensional image of the road surface. These video cameras can then be offset from each other along a direction perpendicular to the ground, as in FIG. 1, or along a direction parallel to the ground, as in FIG. 2.

In addition, the video camera(s) can be positioned and oriented differently.

Preferably, mainly when there is only one video camera, and the image is two-dimensional, the selection means 4 are oriented integrally with the direction of movement given by the means of transport 2.

In other words, the video camera frames the road surface 10 along the direction of travel. However, if several cameras are present, all of them can be oriented along the same direction of travel.

In fact, the selection means 4 can also be oriented in the opposite direction to the direction of travel, as in FIG. 3, or even to the sides as in FIG. 4. For example, the sweeper 1 may comprise one or more feed-back video cameras suitable for checking that the sweeper 1 has been operating correctly and, therefore, preferably oriented contrary to the direction of travel given by the means of transport 2.

The selection means 4 may further comprise a processor 41.

The processor 41 is preferably an electronic component, e.g. comprising an electronic card, suitable for receiving images from the optical means 40 and for enabling the control or command of the cleaning means 3 based on the information obtained.

The processor 41 is, preferably, in fact operatively connected to the optical means 40 and to the cleaning member or members 3. In addition, if there are several cleaning heads 30 on each cleaning member 3, the processor 41 is operatively connected to each cleaning head 30.

The processor 41, therefore, preferably stores frames from the optical means 40 and selects and operates the proper cleaning member 3 or cleaning head 30.

The processor 41 may also comprise a database of comparison images representing a plurality of different specific types of debris 11a.

This database can be constructed on the basis of images acquired by the optical means 40, or, preferably, also includes external images.

Therefore, the processor 41 may comprise storage media that can be externally accessed via physical or even wireless connections.

In addition, the processor 41 preferably compares the frame(s) captured by the optical means 40 with the comparison images in such a way as to select the cleaning head 30 corresponding to the specific detritus 10a identified.

The processor 41 can also take a series of successive frames in such a way as to allow the processing of a preferred trajectory along which the cleaning members 3 travel or, if it is connected to part of the command means of the means of transport 2, to command the sweeper 1 itself along a trajectory that is defined based on the images.

In fact, the processor 41 can also be operatively connected to the common command panel of the sweeper 1 and can operate the cleaning means 3 through this.

In other words, the processor 41 processes the information and sends appropriate electrical command signals to the mechatronic implementing members, which suitably vary the kinematics and spatial position of, for example, the front brush, the side brushes, the central roller, the suction/removal power, and the cleaning area 3a of these elements.

The database of the processor 41 can allow the association of predetermined operating configurations, with the setting of various parameters. For example, the processor 41 can be equipped with software suitable for identifying, in addition to the position, type, approximate weight, and volume of debris 11, its area position in relation to the speed of the travelling sweeper 1 as well. The implementing part of the system's electronic management card can also calculate, in relation to the area position of the debris 11, the times and methods for the cleaning members 3 to work, by activating, in an appropriate way, the different cleaning members 3 or cleaning heads 30, the relative rotation speed, and the pressure to the ground. The operating parameters of these mechanical components can be varied by sending, via the electronics, appropriate electrical command signals to the hydraulic control units, motors, and hydraulic pistons, through the management of the many solenoid valves, control units, and command distributors of the sweeper machine 1.

The selection means 4 can also create a mounting kit adaptable to vehicles or sweepers 1 on which they are not originally installed.

For this purpose, it is preferably sufficient for the processor to provide the first connection means suitable for ensuring the power supply of the selection means 4 and second connection means to the command panel of the transport means 2 or the cleaning members 3, for example, to the hydraulic control unit to actuate or change the various movements appropriately.

The selection means 4 may also comprise connections and sockets that allow the system to be open, adaptive, suitable for receiving and managing other equipment, complementary to the kit, such as a back-up rear view video camera for checking proper cleaning, a front laser scanner or a SLAM laser scanner that can enable the system to capture three-dimensional images of the road, debris 11, sidewalks, and any obstacles.

The sweeper 1 may also comprise a display, available in the cab or passenger compartment in which the operator usually sits, suitable for projecting, on the windscreen, the essential operating data of the machine and the path to be followed for the areas to be cleaned, for example as calculated by the processor 41.

The sweeper 1 can, therefore, provide that processor 41 connect to geolocation systems, such as GPS, to follow predetermined routes and precisely follow the edge of the pavement and the centre of the road. These routes can be managed, programmed remotely and in real time, thus leaving the operator with only the control and safety functions to manage.

Therefore, the processor 41 can be managed, via the second connection means, if wireless, remotely and can enable the management of fleets of sweepers 1 from a single central location via a connection, for example, via the internet.

The invention comprises a new road cleaning method.

The method is preferably carried out with the sweeper 1 described above.

In particular, it comprises different steps depending on the functions implemented by the selection means 4.

If the selection means 4 are mainly responsible for at least the location of the debris 11, then the method preferably comprises at least the debris 11 location steps on the road surface 10, the selection of the cleaning members 3, the cleaning area 3a of which covers the debris 11 during the movement of the sweeper 1, and the operation of the cleaning members 3.

In particular, during the selection step, at least one frame captured by the optical means 40 is processed by the processor 41.

Moreover, as already mentioned, during the operating step, the processor 41 can construct a path or trajectory of travel for the cleaning members 3 based on the frames received from the optical means 40.

In addition, if the method is suitable for identifying debris 11, it may comprise, in addition to or alternatively to the previous steps, at least the steps of identifying the type of debris 11 and selecting the cleaning head 30 corresponding to the specific type of debris 11a.

In particular, during the identification step, the processor 41 preferably compares at least one frame, or even more than one, with the comparison images present in its database in order to select the cleaning head 30, and possibly the correct processing machining parameters, corresponding to the specific type of detritus 10a identified.

Preferably, but not necessarily, if the method involves both the identification and the location of the debris 11, it first carries out the identification step and then the location step.

In this case, the method is essentially a routine one that involves, in order, the detection, identification, and location of the debris 11 on the road surface 10.

In conclusion, the method may also comprise a switching-off step for the cleaning members 3 when the cleaning area 3a is no longer covering the debris 11. In this way, it may consume less energy.

From a logical point of view, the software used to manage the cleaning method covered by the patent essentially performs the following functions in the sequence described below.

Captures the image of the road and the material to be collected and removed with a focal plane with a variable depth of, for example, 8-13 metres.

Adjusts the 2D/3D view to the light intensity, weather conditions, seasons, natural and artificial lighting present in a given time, in addition to the number of frames given. Therefore, the selection means 4 can also provide for the variation of the focus of the lens of the optical means 40, preferably video cameras, which are fully controllable via the processor 41.

Receives frames or still images, every 1, 3, n seconds by the management electronics that compares them with the reference ones previously loaded in its memory and representative of all possible debris 11 situations or material to be removed and ambient brightness.

Compares, analyses, and processes, using algorithms preset in the software, of the image captured in each frame with those stored in order to identify the type of debris 11 and its position with respect to the sweeper that advances at a certain speed between 4 and 13 Km/h.

Processes the information captured, calculates the times and activities necessary to carry out the appropriate mechanical-hydraulic manoeuvres of the cleaning members 3 for the collection of material identified from the road. For example, the manoeuvres of the brushes, the suction device, and the other members responsible for collecting have periods of inactivity, travel, and implementation of the removal.

These periods are calculated by the electronics and the command software by taking into account the speed of the vehicle at that time as well. The speed of the vehicle can be detected using geolocation systems, as indicated.

After processing, the electronics define an area of the road surface 10 to be swept in which undifferentiated debris 11 is placed, which may be in an area wider than the width of the vehicle's brushing. On the basis of the data processed by the processor 41, a trajectory and working width can be determined based on the path studied by the processor 41, which, for example, assesses whether to use only the central brush and/or the right side, or only the left, or all three by expanding and narrowing the working area, or by varying the ground pressure of the brushes themselves, according to the needs that emerged in the processing of the images.

The implementation step of the manoeuvres, commanded by the electronics, involves the sending of electrical signals to the control units and hydraulic implementation devices of the cleaning members 3. In addition, the suction can be differentiated according to the material and in order to collect dirt on all three lanes, or only on some of them. The control preferably also determines the choice of the optimal rotation speed for that type of material and, if not necessary, stops the rotation of some brushes by lifting them off the ground to avoid wear and energy consumption.

In conclusion, a control can be carried out by means of a video camera placed on the back of the sweeper machine that provides a feed-back comparison of the cleaning efficiency allowing the operator an immediate visual control.

The automated road sweeper 1 and its relative road cleaning method according to the invention achieve significant advantages.

In fact, the sweeper 1 has a high efficiency in cleaning the road, lower energy consumption, and less wear of the brushes by adjusting the behaviour of the members of the vehicle according to the debris 11 present on the road surface 10, i.e. the material to be removed.

In particular, the sweeper 1 allows you to improve the effectiveness of cleaning even in the presence of less experienced, distracted, or tired operators due to the monotony of street cleaning operations at very low speed.

The conformation of the selection means 4 also allows the transfer of the experience and skills of an expert operator to this automated mechatronic system equipped with a two- to three-dimensional view of the road and the material to be removed, subsequently optimising the performance in relation to what is detected on the ground.

Another advantage of the sweeper is that it automatically adapts to the various types of debris 11 to be removed from the road surface 10 during the collection and removal steps.

Moreover, due to their simplicity, the selection means 4 can be made as kits of several elements, modular and open, which can be installed on all road, industrial, and indoor sweeping machines.

The invention is subject to variations falling within the scope of the inventive concept defined by the claims.

In such context, all of the details can be replaced by equivalent elements and any materials, shapes, and sizes can be used.

The invention claimed is:

1. An automated road sweeper comprising:
   means of transport suitable to allow said sweeper to travel on a road surface including debris,
   a plurality of cleaning members arranged at fixed points located in different portions of said sweeper and each said cleaning member suitable for cleaning within a predetermined cleaning area, and
   selection means operatively connected to said cleaning members, suitable for scanning said road surface and locating said debris so as to select and exclusively operate said cleaning members, the predetermined cleaning area of which covers said debris during the movement of said sweeper.

2. The sweeper according to claim 1, wherein each of said cleaning members includes a plurality of cleaning heads, each of which is suitable for cleaning up a specific debris of said debris, said selection means identify the type of said debris and select said cleaning head corresponding to said specific debris.

3. The sweeper according to claim 2,
   wherein said selection means are optical means suitable to record at least one frame of said road surface, said selection means being oriented integrally with the direction of motion given by said means of transport,
   wherein the optical means comprise a plurality of video cameras suitable for reconstructing the three-dimensional image of the road surface,
   wherein said selection means comprise a processor operatively connected to said optical means and said cleaning members so as to store said frames from said optical means and select and operate said at least one selected cleaning member.

4. The sweeper according to claim 1, wherein said selection means are optical means suitable to record at least one frame of said road surface, said selection means being oriented integrally with the direction of motion given by said means of transport.

5. The sweeper according to claim 4, wherein said selection means comprise a processor operatively connected to said optical means and said cleaning members so as to store said frames from said optical means and select and operate said at least one selected cleaning member.

6. The sweeper according to claim 1, wherein the optical means comprise a plurality of video cameras suitable for reconstructing the three-dimensional image of the road surface.

7. The sweeper according to claim 1, wherein the selection means is operatively connected to said cleaning members for
   locating the debris and
   to select and operate only the cleaning members the cleaning area of which covers the debris during the movement of the sweeper and
   to not operate the cleaning members the cleaning area of which do not cover the debris during the movement of the sweeper.

8. The sweeper according to claim 1, wherein the cleaning members comprise brushes, wherein the selection means, in the cleaning area having no debris, stops the rotation of the brushes by lifting the brushes off the ground.

9. A road cleaning method for cleaning a road surface including debris by means of a sweeper according to claim 1 including a plurality of cleaning members arranged at fixed points located in different portions of said sweeper and each said cleaning member suitable for cleaning within a predetermined cleaning area,
   said method being comprising the steps of:
   locating said debris on said road surface,
   selecting said cleaning members, the said cleaning area of which covers said debris during the movement of said sweeper,
   operating said cleaning members.

10. The method according to claim 9, comprising the further step of switching off said cleaning members when said cleaning area is no longer covering said debris.

11. The method according to claim 9, wherein said cleaning members include a plurality of cleaning heads, each of which is suitable for cleaning up a specific debris of said debris, and said method further comprises identifying the type of said debris and selecting said cleaning head corresponding to said specific debris.

12. The method according to claim 11, wherein said processor includes a database of comparison images representing a plurality of different specific debris, and in said identifying step said processor compares said at least one frame with said comparison images so as to select said cleaning head corresponding to said identified specific debris.

13. The method according to claim 9, wherein said sweeper comprises selection means including optical means suitable to record at least one frame of said road surface and at least one processor operatively connected to said optical means and said cleaning members, and said selecting step includes processing of said at least one frame by said processor so as to select said cleaning member.

* * * * *